Sept. 30, 1969   J. W. DAVIS ETAL   3,469,734
BURST DIAPHRAGM FLOW INITIATOR

Filed Dec. 28, 1967   3 Sheets-Sheet 1

JOHN W. DAVIS
OLEN E. HILL
*INVENTOR.(S)*

BY *McCoy*
*Wayland H. Riggins*
ATTORNEYS

JOHN W. DAVIS
OLEN E. HILL
INVENTOR(S)

Sept. 30, 1969   J. W. DAVIS ETAL   3,469,734
BURST DIAPHRAGM FLOW INITIATOR
Filed Dec. 28, 1967   3 Sheets-Sheet 3

JOHN W. DAVIS
OLEN E. HILL
INVENTOR.(S)

BY
ATTORNEYS

United States Patent Office 3,469,734
Patented Sept. 30, 1969

3,469,734
BURST DIAPHRAGM FLOW INITIATOR
John W. Davis and Olen E. Hill, Huntsville, Ala., assignors to the United States of America as represented by the Administrator of the National Aeronautics and Space Administration
Filed Dec. 23, 1967, Ser. No. 694,340
Int. Cl. B65d 25/00
U.S. Cl. 220—89                                 5 Claims

ABSTRACT OF THE DISCLOSURE

A flow initiator for installation in a short duration wind tunnel or other facility for instantaneously starting the flow of gas from a high pressure reservoir into a lower pressure receiver. A multiple element grid is disposed in a tube section with the grid elements extending transversely of the tube and supporting a Mylar diaphragm that closes the tube separating the high pressure gas from the lower pressure gas. An air-actuated multibladed cutter is housed within the supporting grid, and shears the diaphragm into several distinct petals. The higher pressure gas forces the petals of the diaphragm to the full open position in a few milliseconds.

The invention described herein was made by employees of the United States Government and may be manufactured and used by or for the Government for governmental purposes without the payment of any royalties thereon or therefor.

BACKGROUND OF THE INVENTION

This invention relates generally to flow initiators and more particularly to a device for effecting ultrarapid flow initiation of gas from a high pressure reservoir to a lower pressure receiver.

In connection with certain scientific and engineering activities, it is often desirable or necessary to produce an extremely rapid start of a flow of gas through a tube or conduit. One such field of work is that involving wind tunnel technology which constitutes a very important aspect of the aerospace field in the many types of testing performed by utilizing wind tunnels. In wind tunnel facilities designed for short duration tests it is essential that a means be provided for initiating the flow of gas from a high pressure tube into a lower pressure receiver within a few milliseconds.

Prior devices for producing initiation of gas flow in wind tunnels include quick opening valves, pyrotechnic devices and metal diaphragms designed to burst under gas pressure. The metal diaphragm initiators and the quick opening valves do not respond as rapidly as desired in short duration wind tunnel tests and the metal diaphragms shed undesirable metal particles upon bursting. Moreover, the quick opening valves are very expensive and not very practical in association with large diameter tubes and large pressures. The pyrotechnic initiators could probably provide the necessary quick response but are relatively expensive and hazardous and also shed undesirable particles during the bursting process.

SUMMARY OF THE INVENTION

The invention comprises a multiple element grid support disposed within a gas conducting tube with the grid support housing a reciprocating cutter. A diaphragm made of a plastic, such as Mylar, is supported on the grid elements normal to the gas flow with the diaphragm being stressed against the grid support elements. When gas flow initiation is desired the cutter is actuated and shears the diaphragm into a plurality of distinct petals and the pressurized gas forces the light petals to the full open position in a period of a few milliseconds.

Accordingly, it is a general object of the present invention to provide an improved ultrarapid flow initiator.

A more specific object of the invention is to provide a burst diaphragm flow initiator that is capable of initiating the flow of gas from a relatively high pressure reservoir to a relatively low pressure receiver in a period of a few milliseconds.

Another object of the invention is to provide a flow initiator for use in short duration wind tunnels that has ultrarapid opening response, is economical to use and does not shed undesirable particles during the flow initiating process, while being simple to fabricate and control.

These and other objects and advantages of the invention will become apparent upon reference to the following specification, attendant claims and drawing.

DESCRIPTION OF THE PREFERRED EMBODIMENTS

Figure 1:
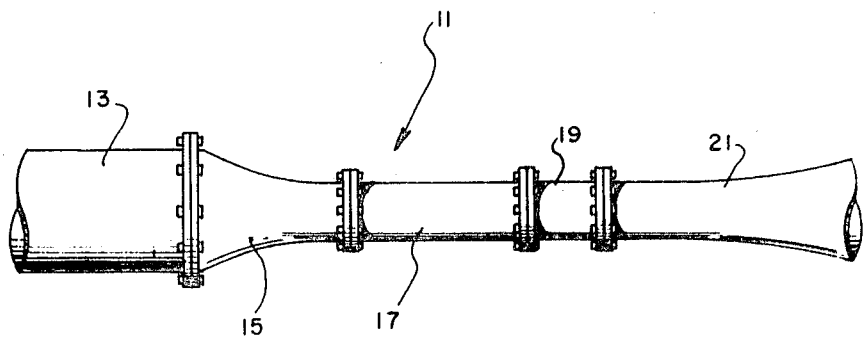
FIGURE 1 is an elevational view of a portion of a wind tunnel facility which portion incorporates a burst diaphragm ultrarapid flow initiator.

Referring to FIGURE 1, therein is shown a portion of a wind tunnel 11 that includes a supply tube 13 joined to one end of a nozzle 15 the other end of which is connected to a test section 17. Arranged between and interconnecting the test section 17 and a receiver tube 21 is an ultrarapid burst diaphragm flow initiator 19. In operation of the wind tunnel 11 a model or specimen to be tested is arranged in the test section 17 and pressurized gas is introduced into the components to the left of the flow initiator 19 which means that pressurized gas is in the test section 17, nozzle 15 and supply tube 13.

A diaphragm 25 (FIGURES 3 and 5) is clamped between the meeting ends of the test section 17 and the flow initiator 19 and seals the passage of gas from the high pressure zone to the low pressure zone which includes the receiver tube 21. At the instant when it is desired to initiate gas flow within the wind tunnel the diaphragm 25 is bursted in a manner to be described subsequently. The diaphragm 25 is made of a plastic such as Mylar and comprises multiple layers with the number of layers depending on the amount of pressure a particular diaphragm is to be subjected to prior to flow initiation.

Figure 2:
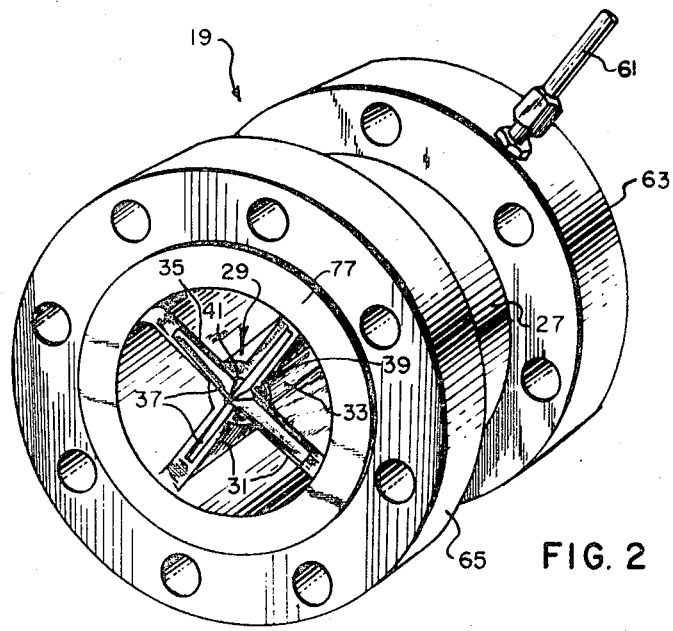
FIGURE 2 is an end perspective view of a flow initiator such as incorporated in FIGURE 1 showing the cutting knife of the initiator in the extended position and the burst diaphragm removed.
Figure 3:
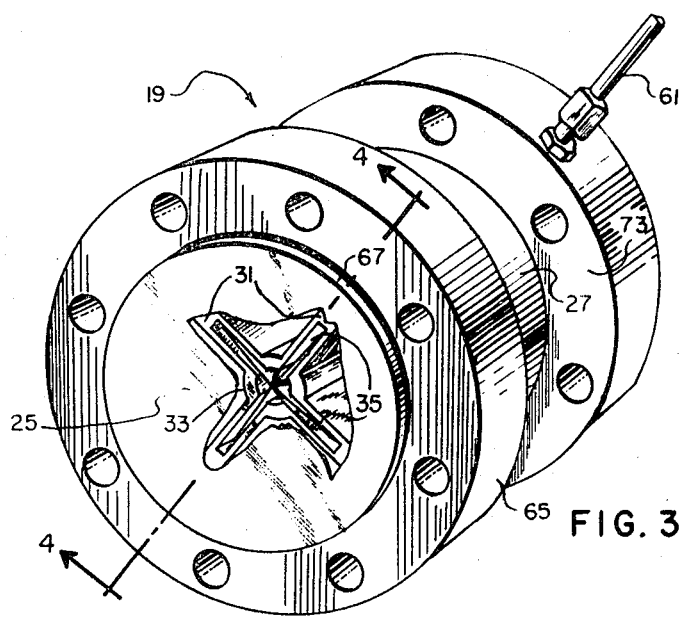
FIGURE 3 is an end perspective view similar to that of FIGURE 2 but showing the sheared burst diaphragm subsequent to flow initiation and the cutting knife retracted.
Figure 4:
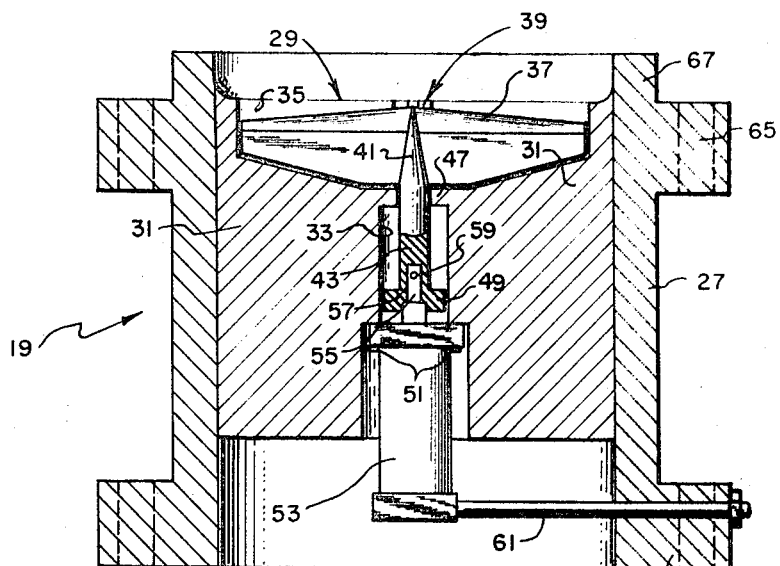
FIGURE 4 is a vertical cross-sectional view taken along line 4—4 of FIGURE 3 with the burst diaphragm removed.

Referring to FIGURES 2, 3 and 4, the flow initiator 19 comprises a tube or chamber section 27 that contains a grid support unit 29 having a plurality of grid elements 31 radiating from a center cylinder 33. The grid elements 31 are joined as by welding to the inside wall of the chamber section 27.

Each of the grid elements 31 has an end slot 35 that receives a blade 37 of a reciprocating cutter 39. The blades 37 are welded to a stem portion 41 that is integral with a plunger 43 (FIGURE 4). The plunger 43 is arranged axially within the cylinder 33, and the cylinder has a reduced diameter end portion 47 that acts as a guide for reciprocating action of the plunger 43. The end of the plunger opposite the blades 37 has an annular flange 49 that provides as top for the plunger when the plunger shifts to extend the cutter 39.

Connected to the end of the cylinder 33 by bolts 51 is an air cylinder 53 that includes a piston having a portion 55 fitted in an opening 57 of the plunger 43, being secured by a dowel pin 59. The piston of the air cylinder 53 is actuated by a source of air pressure (not shown) supplied through a tube 61 that extends through an end flange 63.

The entrance end of the initiator that receives the diaphragm 25 has a flange 65 and a raised annular seat 67 over which the diaphragm 25 is arranged. The edges of the grid elements 31 are recessed a short distance from the surface of the annular seat 67 so that when pressure is applied against the diaphragm 25 this pressure will deform the diaphragm and stress it against the edge surfaces of the grid elements 31. This causes the diaphragm to be in a taut or stretched condition when it is sheared assuring a very clean cut through the diaphragm and a quick separation of the petals formed by the cutter blades.

When the flow initiator 19 is installed in a conduit system such as the wind tunnel 11 (FIGURE 1) with the diaphragm overlying the cutting end of the initiator and being pressed against the edge surfaces of the grid elements 31 by the pressurized gas, air is applied to the air cylinder 53 at the instant flow initiation is desired. The air cylinder piston 55 moves the plunger 43 and thus the blades 37 to the extended position shown in FIGURE 2 thus shearing the diaphragm 25 into four distinct petals. The pressurized gas instantly forces the light Mylar petals to the full open position commencing the flow of gas in a period of a few milliseconds.

Figure 5:
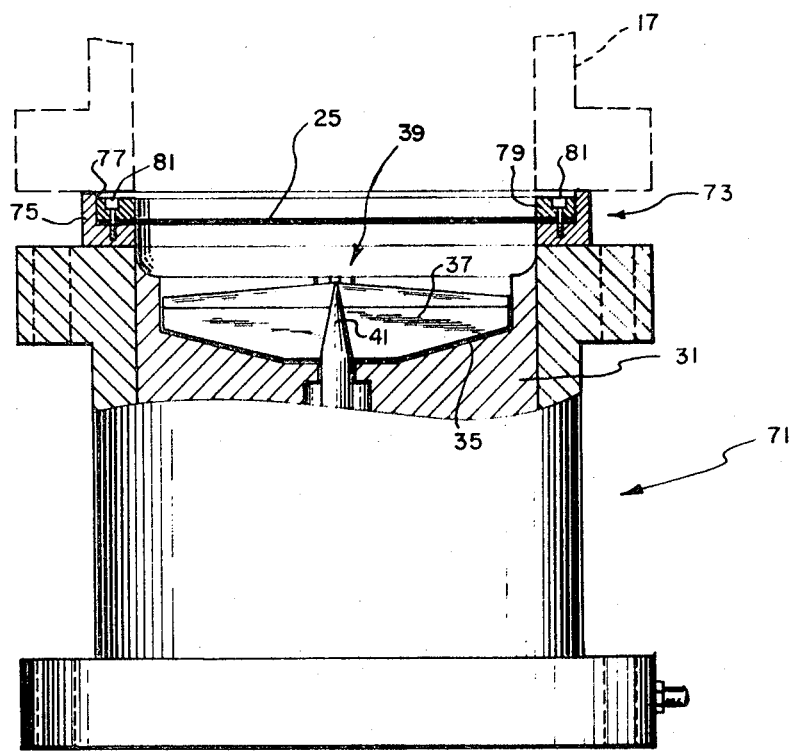
FIGURE 5 is a view, partially in cross-section, of a flow initiator wherein the burst diaphragm is mounted in a special clamping ring.

FIGURE 5 shows a flow initiator 71 that is similar to the flow initiator 19, the difference being that the initiator 71 does not have a raised annular seat, such as 67, for receiving the burst diaphragm 25. Instead, the diaphragm is mounted in a clamp ring assembly 73 adapted to be installed between an end flange of the initiator 71 and the adjacent tube section 17. The clamp ring assembly 73 comprises an outer ring 75 counterbored at 77 for receiving an inner ring 79. The burst diaphragm 25 is clamped between the inner and outer rings by screws 81 closely and equally spaced around the clamp ring assembly 73.

The clamp ring 73 permits a quick replacement of the burst diaphragm from one test to the next where a series of tests are being made. Also the burst diaphragm may be more firmly and uniformly clamped in the clamp ring 73 than is possible with the raised annular seat 67 because a proper number and size of clamping screws are used rather than relying on the limited number of large bolts extending between the tube end flanges.

Figure 6:
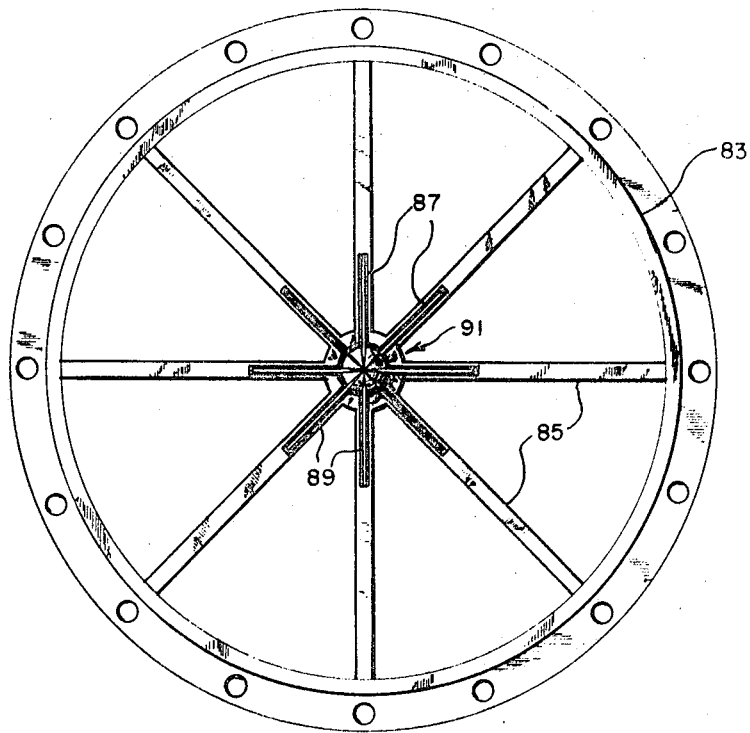
FIGURE 6 is an end elevational view illustrating a modified flow initiator with the burst diaphragm removed, the initiator being particularly adapted for large diameter tubes.

FIGURE 6 shows a modified form of the flow initiator particularly adapted for large diameter tubes. The principal differences between the flow initiator illustrated in FIGURE 6 and that previously described are that the grid elements are increased in number and are extended in radial length to adequately support the burst diaphragm over a larger area presented by a larger diameter tube. A tube 83 contains a grid support having eight grid elements 85. Each of the grid elements 85 has an end slot 87 therein that receives a blade 89 of a cutter 91. The end slots 87 extend less than half the radial dimension of the grid elements 85 and thus the blades 89, when extended, only shear the central portion of the diaphragm. Tests have shown, however, that when the diaphragm is stressed against the grid elements in the manner previously described and sheared into distinct petals in the central region, the force of the pressurized gas will cause the diaphragm to rip along the lines established by the cuts made in the center of the diaphragm thus forcing these petals to the full open position.

We claim:

1. A burst diaphragm flow initiator comprising:
   (a) a chamber having an entrance end and an exit end;
   (b) a burst diaphragm supporting unit in said chamber having a supportin gsurface intermediate the circumferential wall of said chamber and adjacent said entrance end of said chamber for a burst diaphragm to bear upon;
   (c) a slot in said supporting surface opening toward said entrance end of said chamber;
   (d) cutting means including a blade adapted for passing transversely through the plane defined by said supporting surface;
   (e) said blade being aligned with said slot in said supporting surface;
   (f) a clamp ring arranged contiguous and in alignment with said entrance end of said chamber;
   (g) said clamp ring having a burst diaphragm mounted therein;
   (h) said diaphragm closing said entrance end of said chamber.

2. A burst diaphragm flow initiator comprising:
   (a) a chamber having an entrance end and an exit end;
   (b) a burst diaphragm supporting unit in said chamber having a supporting surface adjacent said entrance end of said chamber;
   (c) said supporting unit comprising a plurality of supporting elements radiating from the longitudinal axis of said chamber toward said chamber wall;
   (d) each of said elements having a slot therein opening toward said entrance end of said chamber;
   (e) cutting means including a blade aligned with each of said slots with each of said blades being adapted for passing transversely through the plane defined by said supporting surface.

3. The invention as defined in claim 2 wherein said supporting unit further comprises a cylinder concentric with said axis of said chamber, said cylinder containing a plunger, said plunger being connected to each of said blades.

4. The invention as defined in claim 3 including an air cylinder aligned with said plunger, said air cylinder having a piston therein, said piston being connected to said plunger.

5. The invention as defined in claim 2 wherein said slots in said elements extend less than half the radial dimension of said elements.

References Cited

UNITED STATES PATENTS 3,101,733   8/1963   Lord _____ 137—68

RAPHAEL H. SCHWARTZ, Primary Examiner